(12) United States Patent
Brockhaus et al.

(10) Patent No.: US 7,117,750 B2
(45) Date of Patent: Oct. 10, 2006

(54) METHOD FOR OPERATING A MAGNETOINDUCTIVE FLOWMETER

(75) Inventors: Helmut Brockhaus, Dinslaken (DE); Wilhelm Florin, Duisburg (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 18 days.

(21) Appl. No.: 10/978,509

(22) Filed: Nov. 1, 2004

(65) Prior Publication Data

US 2005/0115334 A1  Jun. 2, 2005

(30) Foreign Application Priority Data

Nov. 27, 2003 (DE) .................. 103 56 007

(51) Int. Cl.
*G01F 1/58* (2006.01)
(52) U.S. Cl. .................................... 73/861.12
(58) Field of Classification Search .............. None
See application file for complete search history.

(56) References Cited

U.S. PATENT DOCUMENTS

| | | | |
|---|---|---|---|
| 4,969,363 A | 11/1990 | Mochizuki | |
| 5,426,984 A | 6/1995 | Rovner et al. | |
| 5,880,376 A | 3/1999 | Sai et al. | |
| 6,392,416 B1 | 5/2002 | Keech | |
| 6,804,613 B1 * | 10/2004 | Ishikawa et al. | 702/45 |

| | | | |
|---|---|---|---|
| 2003/0051557 A1 | 3/2003 | Ishikawa et al. | |

FOREIGN PATENT DOCUMENTS

| | | |
|---|---|---|
| DE | 196 37 716 C1 | 4/1998 |
| DE | 101 18 002 A1 | 10/2002 |
| JP | 59174718 B | 3/1983 |

OTHER PUBLICATIONS

European Patent Office, Search Report, Apr. 14, 2005, App. No. 04021909.9-1236-.

* cited by examiner

*Primary Examiner*—Harshad Patel
(74) *Attorney, Agent, or Firm*—Cesari and McKenna, LLP; John F. McKenna

(57) ABSTRACT

A method for operating a magnetoinductive flowmeter of the type including a measuring tube through which flows an electrically conductive medium, at least two electrodes that are in direct conductive contact with the medium, and at least one magnetic field coil that serves to generate a magnetic field which permeates at least part of the medium and in which a predefined current is impressed between two electrodes that are in wet contact with the flowing medium, the voltage present between the two electrodes or between one of the two electrodes and another electrode that is in wet contact with the flowing medium is measured, and a resistance value is derived from the ratio of the impressed current to the measured voltage. This permits the determination and read-out of the conductivity of the medium flowing through the measuring tube, which constitutes an added benefit for the user of the magnetoinductive flowmeter.

13 Claims, 1 Drawing Sheet

METHOD FOR OPERATING A MAGNETOINDUCTIVE FLOWMETER

This invention relates to a method for operating a magnetoinductive flowmeter incorporating a measuring tube through which flows an electrically conductive medium, at least two electrodes that are in electrically conductive contact with the medium, as well as at least one field coil for generating a magnetic field that pervades at least part of the medium.

BACKGROUND OF THE INVENTION

Magnetoinductive flowmeters and methods for operating magnetoinductive flowmeters of the type referred to above have been well known for some time and are used in a wide variety of applications. The underlying precept of a magnetoinductive flowmeter for fluid media goes all the way back to Faraday who in 1832 proposed applying the principle of electrodynamic induction in flow-rate measurements. According to Faraday's law of induction, a flowing medium that contains charge carriers and passes through a magnetic field generates an electric field intensity perpendicular to the direction of flow and to the magnetic field. A magnetoinductive flowmeter takes advantage of Faraday's law of induction in that a magnet, usually consisting of two magnetic poles, each with a field coil, generates a magnetic field in the measuring tube typically perpendicular to the direction of flow. Within that magnetic field, each volume element of the flowing medium traveling through the magnetic field and containing a certain number of charge carriers contributes its field intensity to a measuring voltage that can be collected through measuring electrodes.

In conventional magnetoinductive flowmeters the measuring electrodes are designed for direct-conductive or capacitive coupling with the flowing medium. This invention addresses flowmeters designed for direct-conductive coupling with the flowing medium.

A salient feature of magnetoinductive flowmeters is the proportionality between the measuring voltage and the flow rate of the medium averaged across the diameter of the measuring tube, i.e. between the measuring voltage and the volumetric flow.

Actual flow-measuring operations employing a magnetoinductive flow-measuring process usually involve periodic alternation of the magnetic field. Prior art has developed a variety of approaches to that effect, such as the use of an alternating field especially by connecting the field coils of the magnet directly to an AC line source which produces a sinusoidal 50 Hz alternating field. Nowadays, however, the general practice is to work with a switched continuous field to avoid transformational interference voltages and line noise potentials. A switched continuous field is produced by feeding the field coils of the magnet a current with a periodic square-wave pattern of periodically alternating polarity. It is also possible, however, to obtain magnetoinductive flow measurements using a pulsating continuous field that is produced by periodically feeding the field coils of the magnet a time-based square-wave current of always the same polarity. The preferred method, however, involves the periodic polarity reversal of the field current since changing the polarity of the magnetic field makes it possible to suppress interference signals such as electrochemical noise.

The voltage between the measuring electrodes, being proportional to the flow rate, is usually quite low, typically in the microvolt range. Measuring that voltage requires high resolution (about 100 nV); in conventional magnetoinductive flowmeters employing the switched constant-field principle, the measuring frequency is in the 1 to 100 Hz range.

The only limiting factor in flow measurements using a magnetoinductive flowmeter essentially consists in adequate electric conductivity of the medium, but in many cases the conductivity of the medium is unknown. A magnetoinductive flowmeter which in simple fashion could determine the conductivity of the medium flowing through the measuring tube would, therefore, offer an added benefit to the user of the magnetoinductive flowmeter. Another added benefit to the user of a magnetoinductive flowmeter would be the ability to determine the leakage rate of an electrode, meaning the condition in which liquid accumulates behind an electrode, typically the reference electrode on the bottom of the measuring tube.

SUMMARY OF THE INVENTION

It is, therefore, the objective of this invention to introduce a method for operating a magnetoinductive flowmeter that offers the user of the flowmeter an added benefit.

Based on the method described above, the solution to this objective is characterized in that a predefined current is impressed between two electrodes that are in wet contact with the flowing medium, that a measurement is taken of the voltage that is present between the two electrodes or between one of the two electrodes and another electrode which is in wet contact with the flowing medium, and that a resistance value is derived from the ratio between the impressed current and the voltage being measured.

The electrodes concerned may be any electrodes of the magnetoinductive flowmeter. A magnetoinductive flowmeter usually contains at least two measuring electrodes that are positioned opposite each other and whose connecting line extends in a direction perpendicular to both the flow direction of the medium and the direction of the magnetic field. In addition, a magnetoinductive flowmeter can contain other electrodes, specifically a reference electrode typically situated on the bottom of the measuring tube, and a fill-level monitoring electrode located in the upper wall area of the measuring tube. This makes it possible for instance to detect an only partly filled measuring tube when the resistance between the reference electrode and one of the measuring electrodes is very high because the electrically conductive medium flowing through the measuring tube does not reach all the way up to the fill-level monitoring electrode.

The resistance value, determined in accordance with this invention from the ratio between the impressed current and the measured voltage, allows the user of the magnetoinductive flowmeter to derive various added benefits, explained in detail below.

In one preferred embodiment of the invention, the resistance value, derived from the ratio between the impressed current and the voltage being measured, can be used to determine the conductivity of the medium flowing through the measuring tube. That conductivity value for the medium flowing through the measuring tube can then be processed further in the magnetoinductive flowmeter, and via additional or alternative output means the user can read out the conductivity value. In an especially preferred embodiment of the invention, the conductivity K of the medium flowing through the measuring tube is determined by applying the formula $$K = c\frac{1}{R}$$

where c is a constant and R is the resistance determined based on the ratio between the impressed current and the voltage being measured. In a particularly preferred embodiment of the invention, specifically when using a circular electrode with a diameter d, the value applied for the constant c is 1/(2d).

The current impressed between the two electrodes can essentially be any current. More specifically, the impressed current can be an alternating current or a current with a periodic square-wave pattern. In a preferred implementation of the invention, the amplitude of the impressed current does not exceed 10 µA or, preferably, 1 µA.

In a preferred embodiment of the invention, the frequency of the impressed current is in the range from 100 to 500 Hz. This preferred aspect of the invention is based on the observation that in the frequency range from about 100 to about 500 Hz the resistance of an electrode, while also determined by the transitional segment between the electrode and the flowing medium that is known to be formed by an electrochemical double layer, is frequency-dependent. The double layer, constituting a galvanic element, exhibits a frequency dependence of an extent whereby, outside the 100 to 500 Hz frequency range, the resistance drops off as the frequency is increased. But within the frequency range from 100 to 500 Hz, the resistance remains essentially constant, allowing Ohm's law to be applied.

Measuring the voltage in relation to the impressed current can be accomplished in different ways. In a preferred embodiment of the invention, however, the voltage is measured in phase locked fashion relative to the impressed current. This permits the differentiation between the real and the imaginary resistance component, with the sum or the real resistance component serving as the basis for determining the resistance value.

In a preferred embodiment of the invention, the two electrodes may constitute measuring electrodes. In that case, the predefined current is impressed between the measuring electrodes, the voltage that is present between the measuring electrodes is measured and the resistance value applied is represented by the ratio of the voltage present between the measuring electrodes to the current impressed between the measuring electrodes. This represents a two-point measurement in which the current is impressed between the same electrodes between which the voltage is measured.

In another preferred embodiment of the invention, two electrodes may serve as measuring electrodes while a third electrode serves as the reference electrode or fill-level monitoring electrode. In that case, the predefined current is impressed between one of the measuring electrodes and the third electrode, the voltage between the measuring electrodes is measured and the resistance value applied is constituted of the ratio of the voltage present between the measuring electrodes to the current impressed between the one measuring electrode and the third electrode. The result is a three-point measurement. In this embodiment example of the invention as in the example specified above, the resistance value thus established can be used for instance in the determination of the conductivity of the medium flowing through the measuring tube, as described in detail further above.

In another preferred embodiment of the invention, two electrodes serve as measuring electrodes and an additional electrode serves as the reference electrode or fill-level monitoring electrode, the predefined current is impressed between one measuring electrode and the additional electrode, the voltage present between the two measuring electrodes is measured and a first resistance value is derived from the ratio of the measured voltage to the impressed current, the predefined current is impressed between the other measuring electrode and the additional electrode, the voltage present between the measuring electrodes is measured and a second resistance value is derived from the ratio of the measured voltage to the impressed current, the ratio and/or difference between the first resistance value and the second resistance value is established, and a critical load is detected on at least one of the two measuring electrodes when the ratio or difference established is outside a predefined range of values. As a special output provision, a status message may indicate the critical load on at least one of the two measuring electrodes.

In another preferred embodiment of the invention in which two electrodes serve as measuring electrodes, an additional electrode serves as the reference electrode and another electrode as the fill-level monitoring electrode, the predefined current is impressed between one of the measuring electrodes and one of the additional electrodes, the voltage present between the measuring electrodes is measured and a first resistance value is derived from the ratio of the voltage measured to the impressed current, the predefined current is impressed between the other measuring electrode and the additional electrode, the voltage present between the measuring electrodes is measured and a second resistance value is derived from the ratio of the measured voltage and the impressed current, the predefined current is impressed between the reference electrode and the fill-level monitoring electrode, the voltage present between the reference electrode and the fill-level monitoring electrode is measured and a third resistance value is derived from the ratio of the measured voltage to the impressed current, and a critical condition is detected if the third resistance value deviates by more than a predetermined amount from the sum of the first resistance value and the second resistance value.

Significantly, in a preferred implementation of the invention, this also permits the detection of a leakage of the reference electrode. In this preferred embodiment of the invention, such leakage of the reference electrode is detected when the third resistance value is smaller by more than a predetermined amount than the sum of the first resistance value and the second resistance value. This occurs when, due to leakage, some of the medium has accumulated behind the reference electrode. That reduces the resistance of the reference electrode to below the expected level because of an enlarged surface. As a particular adjunct in a preferred embodiment of the invention, a "leakage" status message appears. Similar to the output of all other values or messages described, this status message may be received via an on-board display on the magnetoinductive flowmeter and/or through a digital interface of the magnetoinductive flowmeter.

In chronological terms, the resistance values may be determined in different ways. In a preferred embodiment of the invention, however, multiple resistance values are determined sequentially, which allows the resistance values to be used directly without further processing. But in a preferred embodiment of the invention, all resistance values are periodically referenced and/or subjected to low-pass filtering.

The resistance values may, in any event, be determined during the course of the flow measurements. In a preferred embodiment of the invention, however, no flow measurements are performed while the resistance values are being determined. In fact, when a magnetic field in the form of an alternating field or a switched continuous field is used, the resistance values can be determined during the switch-over phases of the magnetic field.

This novel method for operating a magnetoinductive flowmeter can be employed with essentially any magnetoinductive flowmeter that is equipped with appropriate electrodes and permits the impression of a corresponding current as well as the measurement of the corresponding voltage. In terms of the electrode leads, however, a preferred embodiment of the invention provides for the electrode leads to be electrically shielded with the potential of the electrodes concerned so as to reduce the effect of cable capacitance.

There are numerous ways in which the method according to this invention for the operation of a magnetoinductive flowmeter can be structured and enhanced. In that context, attention is invited to the dependent claims and to the following description of preferred embodiment of the invention with reference to the attached drawings.

DETAILED DESCRIPTION OF AN ILLUSTRATIVE EMBODIMENT

Figure 1:
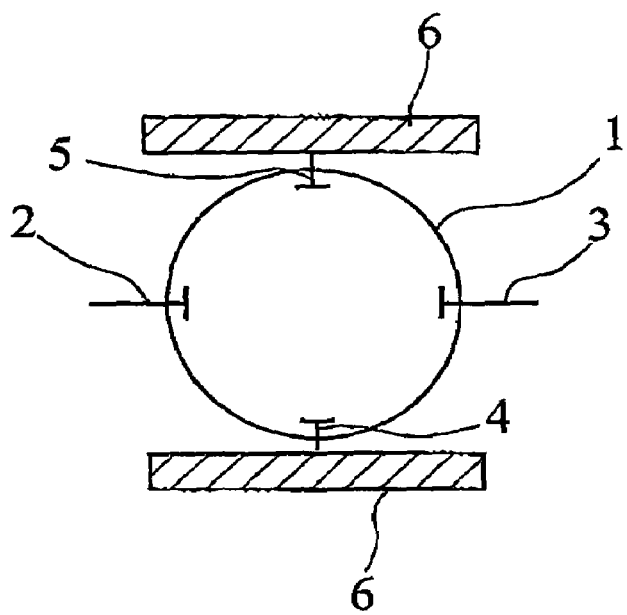
FIG. 1 is; is a schematic representation of a magnetoinductive flowmeter used in applying the method according to this invention.

FIG. 1 is a schematic representation of a magnetoinductive flowmeter for use with our operating method. The magnetoinductive flowmeter incorporates a measuring tube 1, two measuring electrodes 2, 3, a reference electrode 4 and a fill-level monitoring electrode 5, as well as a magnet with two field coils 6 for generating a magnetic field that permeates the measuring tube 1.

When a current I is impressed between an electrode 2, 3, 4, 5 and another electrode 2, 3, 4, 5 and the voltage drop U between two electrodes 2, 3, 4, 5 is measured, it is possible by applying Ohm's law to determine the resistance R of the electrodes concerned as follows:

$$R = \frac{U}{I}.$$

Figure 2:
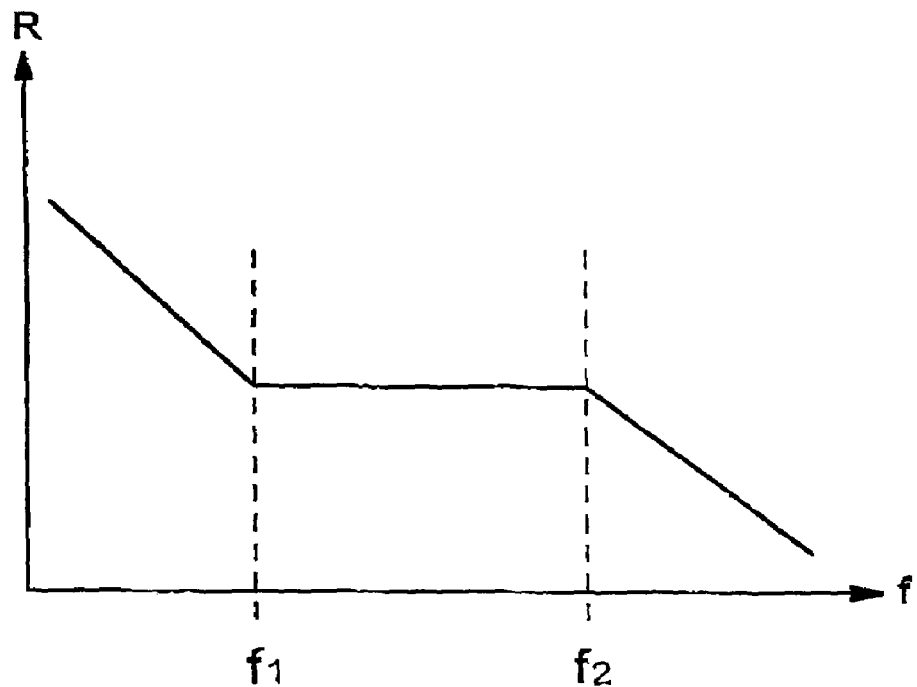
FIG. 2 is shows the dependence of the electrode resistance on the frequency of the impressed current.

As mentioned further above, the transition from one of the electrodes 2, 3, 4, 5 to the medium is constituted of an electrochemical double layer. As a galvanic element that layer is highly sensitive as a function of current conduction and its resistance is particularly frequency-dependent. It has been found that, in principle, the frequency response curve of the electrode resistance follows the pattern illustrated in FIG. 2. In the $f_1 < f < f_2$ segment, the electrode resistance is purely ohmic. In that segment, the following approximation applies for circular electrodes 2, 3, 4, 5:

$$K = \frac{1}{2dR},$$

where K is the conductivity of the medium flowing through the measuring tube 1, R is the electrode resistance and d is the electrode diameter.

The discovery of the dependence of the electrode resistance on the frequency of the impressed current is the reason for not departing from the frequency range between $f_1$ and $f_2$. In practice it has also been found that the lower and the upper limit of the effectively usable frequency range is approximately 100 Hz and approximately 500 Hz, respectively.

The processes described are essentially based on the following methodology: A predefined current is impressed between two electrodes 2, 3, 4, 5. Which specific electrodes are eligible and what can be accomplished will be explained in more detail further below. The impressed current may, for instance, be an alternating current with a square-wave pattern and a frequency of between 100 Hz and 500 Hz, thus making it possible in the subsequent determination of the electrode resistance to work with an essentially pure ohmic resistance as stated above.

Next, the voltage generated between two electrodes 2, 3, 4, 5 due to the impressed current is measured, in which case the electrodes 2, 3, 4, 5 may be the two electrodes between which the predefined current was impressed, making it a two-point measurement. Alternatively, the voltage may be measured between only one of the two electrodes between which the current was impressed, and another electrode 2, 3, 4, 5. This is followed by the determination of a resistance value that is derived from the ratio of the impressed current to the measured voltage. That resistance value may be used, for instance, to determine the conductivity of the medium flowing through the measuring tube, which, in the case of circular electrodes 2, 3, 4, 5, can be accomplished by applying the formula K=1/(2dR) as detailed above. Apart from the flow rate, the conductivity thus determined serves as an additional measured value that can be read out by the user of the magnetoinductive flowmeter, constituting an added benefit.

The electrode resistance can be determined in different ways: For one, the current may be impressed between one of the measuring electrodes 2, 3 and the reference electrode 4, in which case the voltage between the two measuring electrodes 2, 3 is measured. This makes it a three-point measurement in which case the resistance of only one measuring electrode 2, 3 is determined, i.e. only the resistance of measuring electrode 2 alone or the resistance of measuring electrode 3 alone. When the two-point measurement discussed above is applied whereby a current is impressed between the two measuring electrodes 2, 3 and the voltage is measured between the same measuring electrodes 2, 3, the resulting resistance value corresponds to the sum of the resistance values for the measuring electrode 2 and the measuring electrode 3.

The predefined current may also be impressed between the reference electrode 4 and the fill-level monitoring electrode 5, in which case the voltage as well is measured between the reference electrode 4 and the fill-level monitoring electrode 5. The resistance value derived from the ratio of the measured voltage to the impressed current will then be the sum of the resistance values for the reference electrode 4 and that of the fill-level monitoring electrode 5. This again constitutes a two-point measurement.

When all electrodes are of an identical type, the resistance values determined by two-point measurement should be exactly twice the measured values obtained in the three-point measurements; other than that, the resistance values determined in two-point measurements should always be the same as those determined in three-point measurements.

Since magnetoinductive flowmeters always contain the measuring electrodes 2, 3, the conductivity of the medium flowing through the measuring tube 1 can, in all cases, be determined along either one of the two following equations:

$$K = \frac{1}{2d\frac{1}{2}(R_2 + R_3)}$$

$$K = \frac{1}{2d\frac{1}{2}R_{23}}$$

where K is again the conductivity of the medium flowing through the measuring tube 1; d is the diameter of the electrodes 2, 3, 4, 5; $R_2$ is the resistance value for the measuring electrode 2; $R_3$ is the resistance value for the measuring electrode 3, the latter in each case determined by a three-point measurement; and $R_{23}$ is the combined resistance value of the measuring electrodes 2 and 3 determined by a two-point measurement.

For a reliable conductivity determination, the resistance values $R_2$ and $R_3$ actually obtained must be more or less identical. If $R_2$ and $R_3$ are not identical within a predefined or selectable ratio around 1 (e.g. 0.8–1.2), a critical load must be assumed for one of the measuring electrodes 2, 3. In any such case, there will be a higher load on one of the measuring electrodes 2, 3 than on the other and the magnetoinductive flowmeter will output an "electrode load" status message.

If the magnetoinductive flowmeter is equipped with four electrodes 2, 3, 4, 5 as illustrated in FIG. 1, meaning the two measuring electrodes 2, 3, a reference electrode 4 and the fill-level monitoring electrode 5, an additional diagnosis is possible via the reference electrode 4 and the fill-level monitoring electrode 5. As long as the combined resistance value for the reference electrode 4 and the fill-level monitoring electrode 5, determined through a two-point measurement between the reference electrode 4 and the fill-level monitoring electrode 5, remains within a predefined or selectable margin around the said combined sum of the resistance values for the measuring electrode 2 and the measuring electrode 3, the system is working normally—everything is as it should be. However, if the combined resistance value for the reference electrode 4 and the fill-level monitoring electrode 5 is substantially greater than the sum of the resistance value for the measuring electrode 2 and the resistance value for the measuring electrode 3, the measuring tube 1 is probably not completely full and the status message will read "tube not full". The same status message is received when the combined resistance value for the reference electrode 4 and the fill-level monitoring electrode 5 exceeds an absolute, predefined or selectable threshold value. If that absolute threshold value is also exceeded by the resistance values for the measuring electrode 2 and the measuring electrode 3, the status message will say "tube empty".

If, on the other hand, the combined resistance value for the reference electrode 4 and the fill-level monitoring electrode 5 is smaller by a predefined amount than the sum of the resistance values for the measuring electrode 2 and the measuring electrode 3, the assumption can be made that there is an electrode leakage, and liquid has accumulated behind the reference electrode 4. In that condition the resistance for the reference electrode 4 will be lower than expected due to an enlarged surface, in which case the status message "electrode leakage" is received.

Every status message can be received via a status output port, an on-board display and/or a digital interface of the magnetoinductive flowmeter. Also, in the case at hand the resistance measurements do not take place simultaneously but sequentially. Given the four electrodes—measuring electrode 2, measuring electrode 3, reference electrode 4 and fill-level monitoring electrode 5—this would mean the sequential determination of the resistance of the measuring electrode 2, the resistance of the measuring electrode 3, the combined resistance of the reference electrode 4 and the fill-level monitoring electrode 5. In the process, every resistance value is averaged or low-pass-filtered.

As has been indicated further above especially for magnetoinductive flowmeters with long leads, the leads supplying the electrodes 2, 3, 4, 5 are provided with electrically carried shielding in order to reduce the effect of cable capacitance, the shielding being carried with the potential of the electrode 2, 3, 4, 5 concerned.

As a very important point, the measuring frequency for the resistance measurement in a preferred embodiment of the invention here described is greater than the measuring frequency for flow measurements. The measuring frequency for resistance measurements is preferably in the range between 100 and 500 Hz, whereas the upper limit of the frequency for flow measurements is typically around 100 Hz. Conceivably, then, the system could, for instance, be operated with a measuring frequency in the 200 Hz range while the flow rate is measured at a frequency in the 50 Hz range, with both frequencies synchronized in time.

In the implementation examples described with reference to the FIG. 1 diagram, the flow measurement is interrupted during the resistance measurements. Specifically, the resistance measurement takes place during the switch-over phases of the periodically alternating square-wave-type magnetic field. Moreover, the voltage measurement is phase locked with the impressed current, permitting differentiation between the real and the imaginary resistance component. The evaluation is based on the sum or on the real resistance component.

What is claimed is:

1. A method for operating a magnetoinductive flowmeter, said flowmeter incorporating a measuring tube through which flows an electrically conductive medium, at least two measuring electrodes which are in direct conductive contact with the medium, at least one additional electrode that serves as a reference electrode or as a fill-level monitoring electrode, and at least one magnetic field coil that serves to generate a magnetic field which permeates at least part of the medium, said method comprising the following steps:

impressing a predefined current between one of the measuring electrodes and the additional electrode, measuring the voltage generated between the measuring electrodes, deriving from the ratio of the voltage measured between the measuring electrodes and the current impressed between one of the measuring electrodes and the additional electrode a first resistance value, impressing the predefined current between the other of the measuring electrodes and the additional electrode, measuring again the voltage generated between the measuring electrodes, deriving from the ratio of the voltage measured between the measuring electrodes in the previous step and the current impressed between the other measuring electrode and the additional electrode a second resistance value, determining the ratio between the first resistance value and the second resistance value, and detecting a critical load on one of the two measuring electrodes in the event that the ratio is outside a predefined quantitative range.

2. The method as in claim 1, including the step of outputting a status message relative to the critical load on one of the two measuring electrodes.

3. A method for operating a magnetoinductive flowmeter, said flowmeter incorporating a measuring tube through which flows an electrically conductive medium, at least two measuring electrodes which are in direct conductive contact with the medium, one reference electrode which is in direct conductive contact with the medium, one fill-level monitoring electrode which is in direct conductive contact with the medium and at least one magnetic field coil that serves to generate a magnetic field which penneates at least part of the medium, said method comprising the following steps:

impressing a predefined current between one of the measuring electrodes and the reference electrode or the fill-level monitoring electrode, respectively, measuring the voltage generated between the measuring electrodes, determining from the ratio of the measured voltage between the two measuring electrodes and the impressed current between one of the measuring electrodes and the reference electrode a first resistance value, impressing the predefined current between the other of the measuring electrodes and the reference electrode or the fill-level monitoring electrode, respectively, measuring again the voltage generated between the measuring electrodes, deriving from the ratio of the measured voltage between the two measuring electrodes in the previous step and the impressed current between the other of the measuring electrodes and the reference electrode or the fill-level monitoring electrode, respectively, a second resistance value, impressing the predefined current between the reference electrode and the fill-level monitoring electrode, measuring the voltage generated between the reference electrode and the fill-level monitoring electrode, deriving from the ratio of the voltage measured between the reference electrode and the fill-level monitoring electrode and the impressed current between the reference electrode and the fill-level monitoring electrode a third resistance value, and detecting a critical condition in the event that the third resistance value differs by more than a predefmed amount from the sum of the first resistance value and the second resistance value.

4. The method as in claim 3, including the steps of detecting a leakage of the reference electrode when the third resistance value is smaller by more than a predefined amount than the combined sum of the first resistance value and the second resistance value, and generating a corresponding status message.

5. The method as in one of the claims 1 to 4, wherein the shielding of the leads supplying the electrodes is electrically carried with the potential of the respective electrode so as to reduce the effect of cable capacitance.

6. The method as in one of the claims 1 to 4, wherein no flow measurements take place while the resistance value is being derived.

7. The method as in claim 6, including the steps of employing as the magnetic field an alternating field or a switched continuous field, and deriving the resistance value during the switch-over phases of the magnetic field.

8. A method for operating a magnetoinductive flowmeter, said flowmeter incorporating a measuring tube through which flows an electrically conductive medium, at least two measuring electrodes which are in direct conductive contract with the medium, at least one additional electrode that serves as a reference electrode or as a fill-level monitoring electrode, and at least one magnetic field coil that serves to generate a magnetic field which permeates at least part of the medium, said method comprising the following steps:

impressing a predefined current between one of the measuring electrodes and the additional electrode, measuring again the voltage generated between the measuring electrodes, deriving from the ratio of the voltage measured between the measuring electrodes in the previous step and the current impressed between one of the measuring electrodes and the additional electrode a first resistance value, impressing the predefined current between the other of the measuring electrodes and the additional electrode, measuring the voltage generated between the measuring electrodes, deriving from the ratio of the voltage measured between the measuring electrodes and the current impressed between the other measuring electrode and the additional electrode a second resistance value, determining the difference between the first resistance value and the second resistance value, and detecting a critical load on one of the two measuring electrodes in the event that the difference is outside a predefined quantitative range.

9. The method as in claim 8, including the step of outputting a status message relative to the critical load on one of the two measuring electrodes.

10. The method as in claim 8 including the steps of
determining the ratio between the first resistance value and the second resistance value, and detecting a critical load on one of the two measuring electrodes in the event that both said difference and said ratio are outside a predefined quantitative range.

11. The method as in one of the claims 8 or 9, wherein the shielding of the leads supplying the electrodes is electrically carried with the potential of the respective electrode so as to reduce the effect of cable capacitance.

12. The method as in one of the claims 8 or 9, wherein no flow measurements take place while the resistance value is being derived.

13. The method as in claim 12, including the steps of
employing as the magnetic field an alternating field or a switched continuous field, and deriving the resistance value during the switch-over phases of the magnetic field.

* * * * *